(12) United States Patent
Fegler et al.

(10) Patent No.: US 7,793,970 B2
(45) Date of Patent: Sep. 14, 2010

(54) CONVERTIBLE SUITCASE STROLLER APPARATUS AND METHOD

(76) Inventors: Daryne J. Fegler, 769 17 Mile Rd., Arapaho, WY (US) 82510; Kristi S. Fegler, 769 17 Mile Rd., Arapaho, WY (US) 82510

( * ) Notice: Subject to any disclaimer, the term of this patent is extended or adjusted under 35 U.S.C. 154(b) by 114 days.

(21) Appl. No.: 11/970,344

(22) Filed: Jan. 7, 2008

(65) Prior Publication Data
US 2008/0164667 A1 Jul. 10, 2008

Related U.S. Application Data

(60) Provisional application No. 60/878,915, filed on Jan. 5, 2007.

(51) Int. Cl.
*B62B 1/00* (2006.01)
(52) U.S. Cl. .................. 280/643; 280/650; 280/648
(58) Field of Classification Search .............. 280/47.25, 280/47.33, 47.26, 643, 638, 648, 650, 658, 280/47.38; 190/8, 11; 297/17, 129, 183.2
See application file for complete search history.

(56) References Cited

U.S. PATENT DOCUMENTS

| | | | |
|---|---|---|---|
| 290,344 A | 12/1883 | Morris | |
| 820,125 A | 5/1906 | Pennington | |
| 2,724,429 A | 11/1955 | Warner | |
| 2,875,816 A | 3/1959 | Langefeld | |
| 3,506,280 A | 4/1970 | Coupe | |
| 4,846,486 A * | 7/1989 | Hobson | 280/47.25 |
| 4,974,870 A * | 12/1990 | Jarke et al. | 280/643 |
| 5,310,208 A * | 5/1994 | Jarke et al. | 280/643 |
| 5,374,073 A | 12/1994 | Hung-Hsin | |

(Continued)

FOREIGN PATENT DOCUMENTS

FR 1073861 9/1954

(Continued)

OTHER PUBLICATIONS www.onestepahead.com; Ride-on Carry-on; view of product; view of product in use, 2006.

(Continued)

*Primary Examiner*—Hau V Phan
(74) *Attorney, Agent, or Firm*—Santangelo Law Offices, P.C.

(57) ABSTRACT

A convertible suitcase stroller apparatus may comprise a suitcase that is openable at at least one side; a handle assembly that is reconfigurable between a storage configuration and a deployed configuration and that has a handgrip portion and two handle stems, wherein each of the two handle stems has an upper end and wherein the handgrip portion is established substantially between the upper ends; fabric seatback material that is established substantially between the two handle stems when the handle assembly is in the deployed configuration; a child seatbelt that is securable around a child seated directly on the suitcase; and at least two wheels established substantially at a lower portion of the suitcase, wherein a back of a child seated directly on the suitcase is supported against the fabric seatback material, the fabric seatback material is crumpable, and the convertible suitcase stroller apparatus is convertible between: a minimum space occupying configuration, a suitcase only toting configuration and a child toting configuration.

20 Claims, 9 Drawing Sheets

U.S. PATENT DOCUMENTS

| | | | |
|---|---|---|---|
| 5,464,081 A | 11/1995 | Zwanzig | |
| 5,507,508 A | 4/1996 | Liang | |
| 5,642,917 A | 7/1997 | Geiger | |
| 5,690,196 A | 11/1997 | Wang | |
| 5,695,246 A | 12/1997 | Tsai | |
| 5,868,463 A | 2/1999 | MacKenzie et al. | |
| 5,899,467 A * | 5/1999 | Henkel | 280/47.25 |
| 5,988,657 A | 11/1999 | Henkel | |
| 6,241,313 B1 | 6/2001 | Lenz et al. | |
| 6,471,019 B1 * | 10/2002 | Miller | 190/11 |
| 6,644,447 B2 * | 11/2003 | Pohl | 190/8 |
| 6,932,427 B2 | 8/2005 | Tamura | |
| 7,051,853 B2 | 5/2006 | Brown | |
| 7,097,017 B1 | 8/2006 | LaCrosse et al. | |
| 7,213,692 B2 * | 5/2007 | Wang et al. | 190/8 |
| 7,350,857 B2 * | 4/2008 | Bishop | 297/129 |
| 2004/0021353 A1 | 2/2004 | Lozano et al. | |
| 2004/0066069 A1 | 4/2004 | Caldana | |

FOREIGN PATENT DOCUMENTS

NO          100110          10/1960

OTHER PUBLICATIONS

U.S. Appl. No. 60/878,915, filed Jan. 5, 2007; Title: Convertible Suitcase Stroller Apparatus and Method.

* cited by examiner

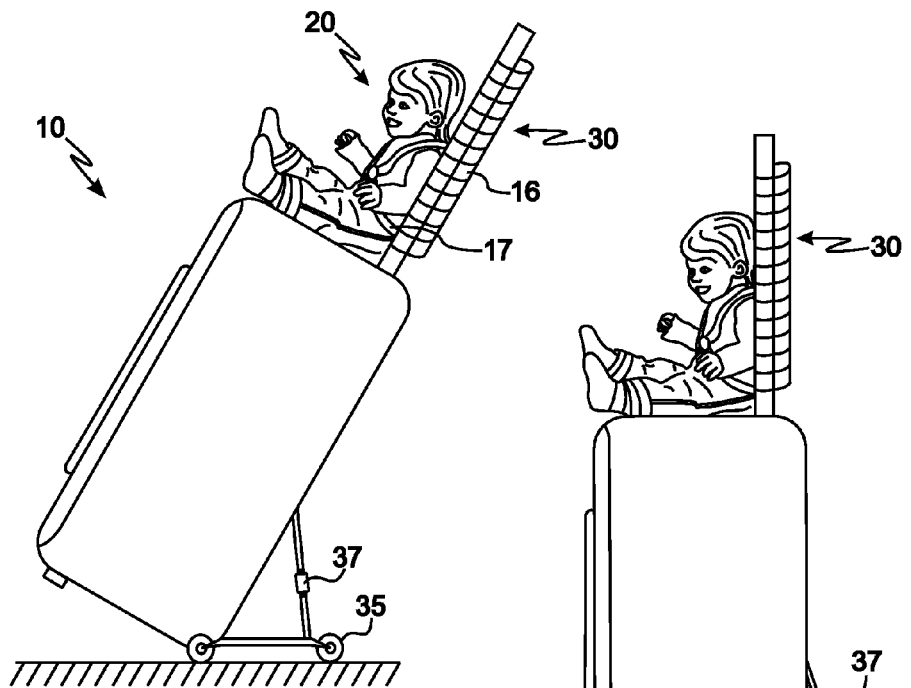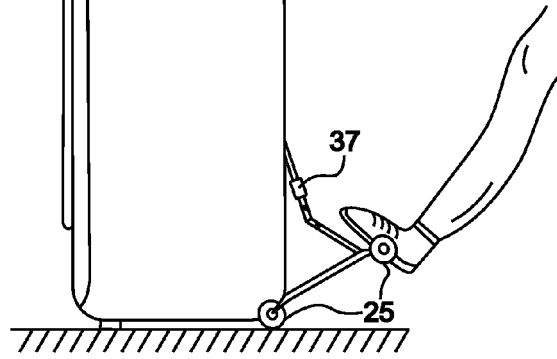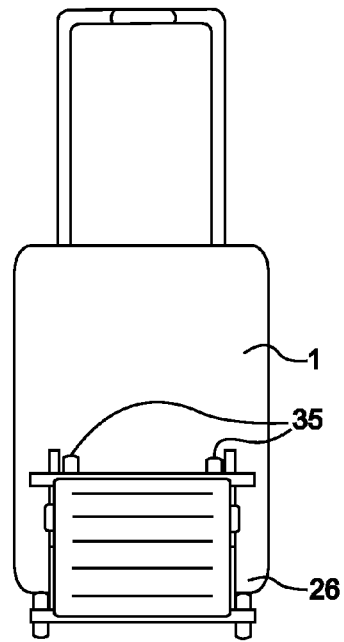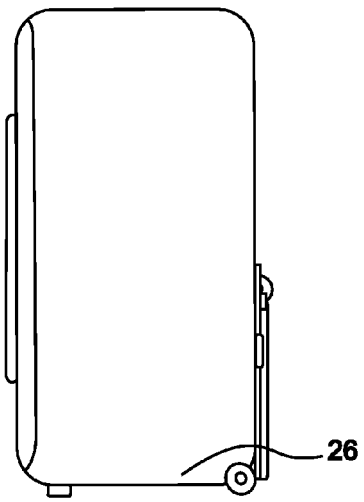
FIG. 3A
FIG. 3B
FIG. 3C
FIG. 3D

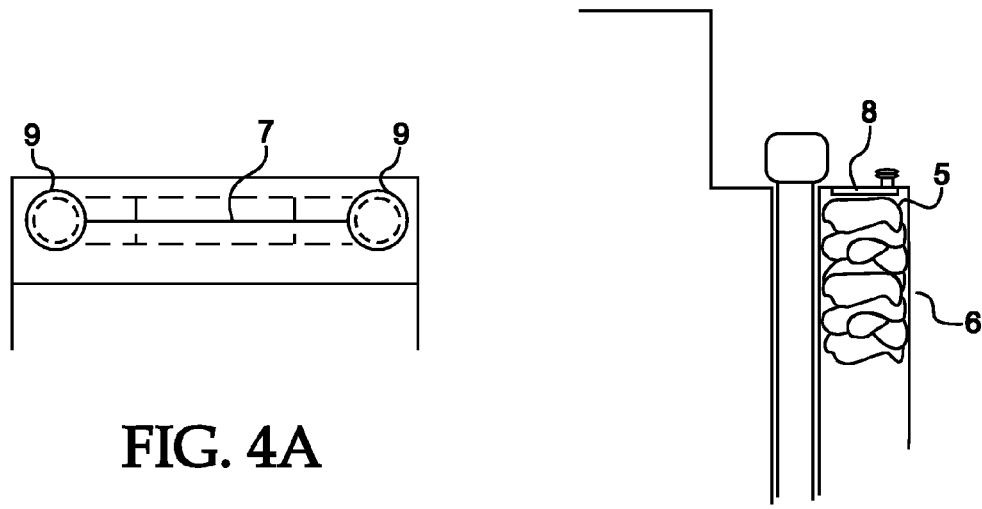
FIG. 4A
FIG. 4C
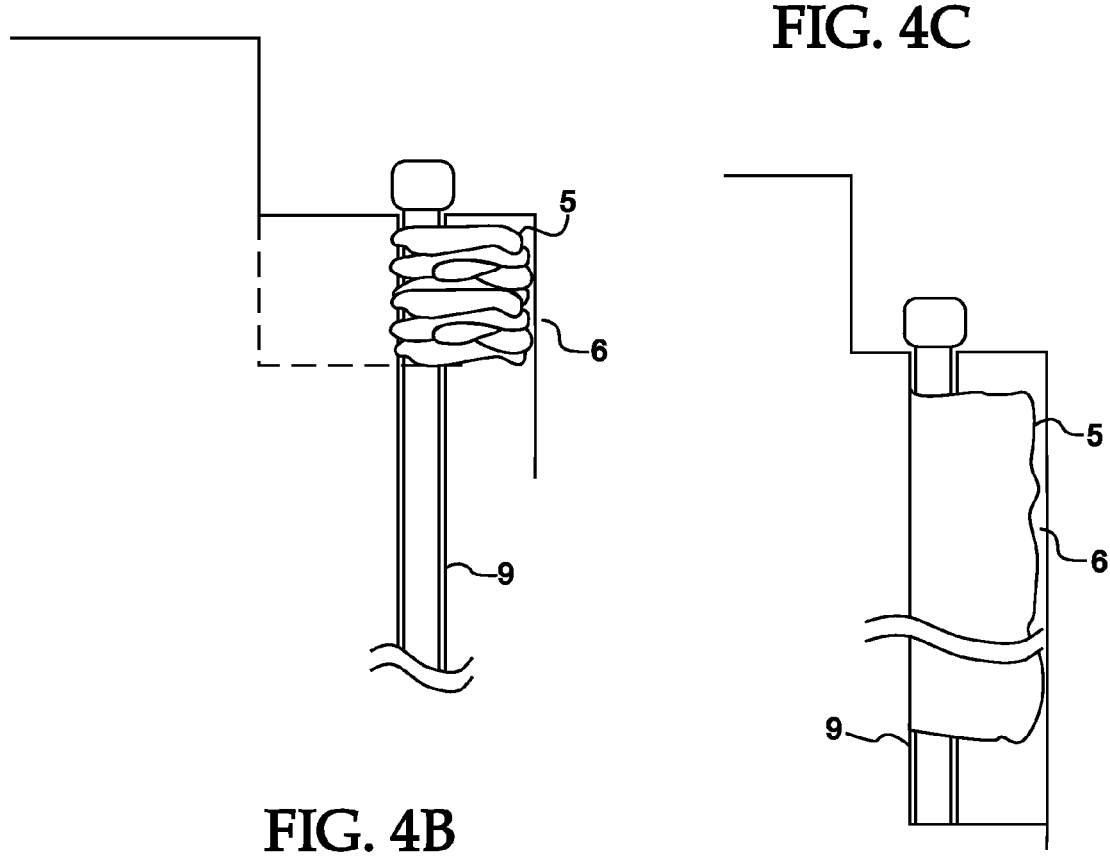
FIG. 4B
FIG. 4D

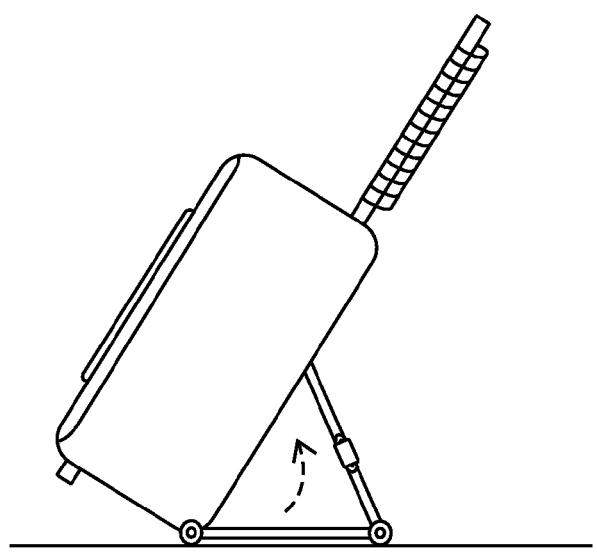
FIG. 6A
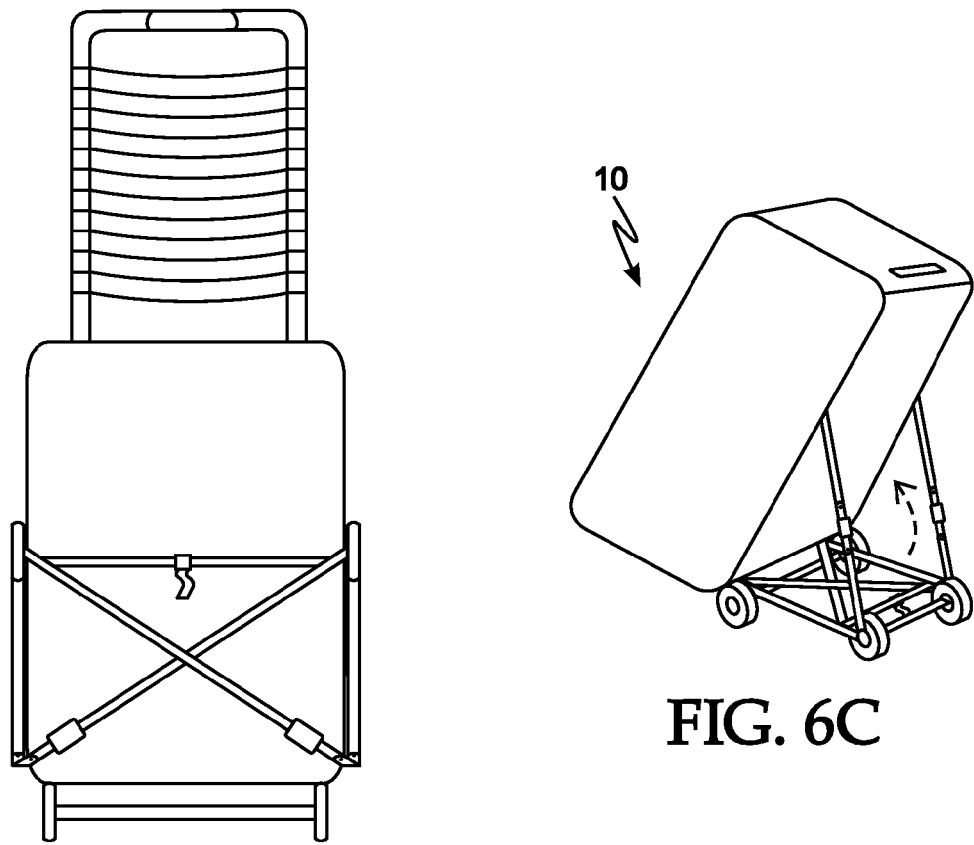
FIG. 6B
FIG. 6C

CONVERTIBLE SUITCASE STROLLER APPARATUS AND METHOD

This US Non-Provisional patent application claims priority to and the benefit of U.S. Provisional Application 60/878,915, filed Jan. 5, 2007, said provisional application incorporated herein by reference.

BACKGROUND

Anyone with children is aware of the difficulties inherent in traveling with children who must, or whom their parents prefer, be strolled instead of walking themselves. One or more parents loaded with luggage and simultaneously pushing a child stroller is not an uncommon site in any airport today. Not only does the stroller occupy one or more of the "pusher's" hands, but strollers often do not fit in suitcases, and, regardless, always take up space.

There have been attempts to somehow alleviate some of these difficulties, to some extent, by enabling wheeled strolling of a child together with wheeled transportation of a suitcase. U.S. Pat. No. 5,988,657, U.S. Pat. No. 6,241,313, U.S. Pat. No. 6,932.427, US Pat. App. No. US2004/0066069, and US Pat. App. No. 2004/0021353 all disclose some type of foldable or attachable suitcase seat. However, none offers the ease of use, economy of design, convenience, and/or facility of set-up as that of the instant inventive technology. Further, all appear to require substantially more additional parts and structures than is required by the instant inventive technology and, as such, appear to require more storage space during non-use of the seat (e.g., while stowed in the overhead compartment of a commercial jet) than does the instant inventive technology.

At least one embodiment of the inventive technology seeks to solve one or more of the above-referenced problems by providing a quick, perhaps even "automatic" set-up of the components of the apparatus. Additional storage space (i.e., that storage space not required by a suitcase without a stroller conversion capability) required due to the suitcase stroller's feature is either small, minimal, or non-existent, as in certain embodiments of the inventive technology, either: (a) the seat back material may be stowable in a small storage compartment therefore; and/or (b) any "additional" wheels (i.e., those not found in conventional rollable suitcases) may be storable so as to not increase (or so as to not significantly increase) the space occupied by the apparatus in stored configuration.

Of course, other advantages of particular embodiments of the inventive technology may be revealed in the following description.

SUMMARY OF THE INVENTION

The inventive technology, in particular embodiments, may provide a convertible suitcase stroller with which a child can be toted on top of a rolling suitcase, thereby allowing for simultaneous transportation of both. It may include a child seat back material storage, perhaps in the form of a compartment, in which a child seat back material can be stored during non-use of the child seat feature. Embodiments may utilize suitcase handle stems which, after reconfiguration of the handle assembly from a handle storage to a deployed configuration, act as side supports for the child seat back material. Certain embodiments may allow for "automatic" conversion of the suitcase stroller apparatus from its suitcase configuration to its stroller configuration in that the stored child seat back material may "automatically" reconfigure from a child seat back material storage configuration to a seated child support configuration upon reconfiguration of the handle assembly from a handle storage to a handle deployment configuration. The child seat back material, in its seated child support configuration, in conjunction with the side of the suitcase that, during rolling thereof, is, effectively the suitcase "top," may form the child seat. Further, the apparatus may include at least two wheels, and in particular embodiments may include four wheels to provide additional stability during wheeled toting of the suitcase and child (child toting configuration). At least two of the wheels may be reconfigurable between a wheel storage and a deployed wheel configuration.

BRIEF DESCRIPTION OF THE DRAWINGS

FIG. 3A shows a side view of at least one embodiment of the inventive apparatus.

FIG. 3B shows a side view of at least one embodiment of the inventive apparatus while the wheels are being deployed.

FIG. 3C shows a rear view of at least one embodiment of the inventive apparatus with wheels in wheel storage configuration.

FIG. 3D shows a side view of at least one embodiment of the inventive apparatus with wheels in wheel storage configuration.

FIG. 4A shows a top view of a side of at least one embodiment of the inventive technology, in particular showing the handle stem wells (handle assembly shown with dashed lines in order that the slot opening, as appearing in at least one embodiment of the inventive technology, may be shown).

FIG. 4B shows a side, cut-away view of an embodiment of the inventive technology, in particular showing the child seat back material "crumpled" in child seat back material storage configuration.

FIG. 4C shows a side, cut-away view of an embodiment of the inventive technology, in particular showing the child seat back material "crumpled" in child seat back material storage configuration.

FIG. 4D shows a side, cut-away view of an embodiment of the inventive technology, in particular showing the child seat back material in child seat back material storage configuration. In this embodiment(s) there is shown a child seat back material storage that is large enough to store the child seat back material in substantially uncrumpled fashion.

FIG. 6A shows a side view of an embodiment of the inventive apparatus.

FIG. 6B shows a rear view of an embodiment of the inventive apparatus.

FIG. 6C shows a rear perspective view of an embodiment of the inventive apparatus.

DETAILED DESCRIPTION OF THE PREFERRED EMBODIMENTS

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
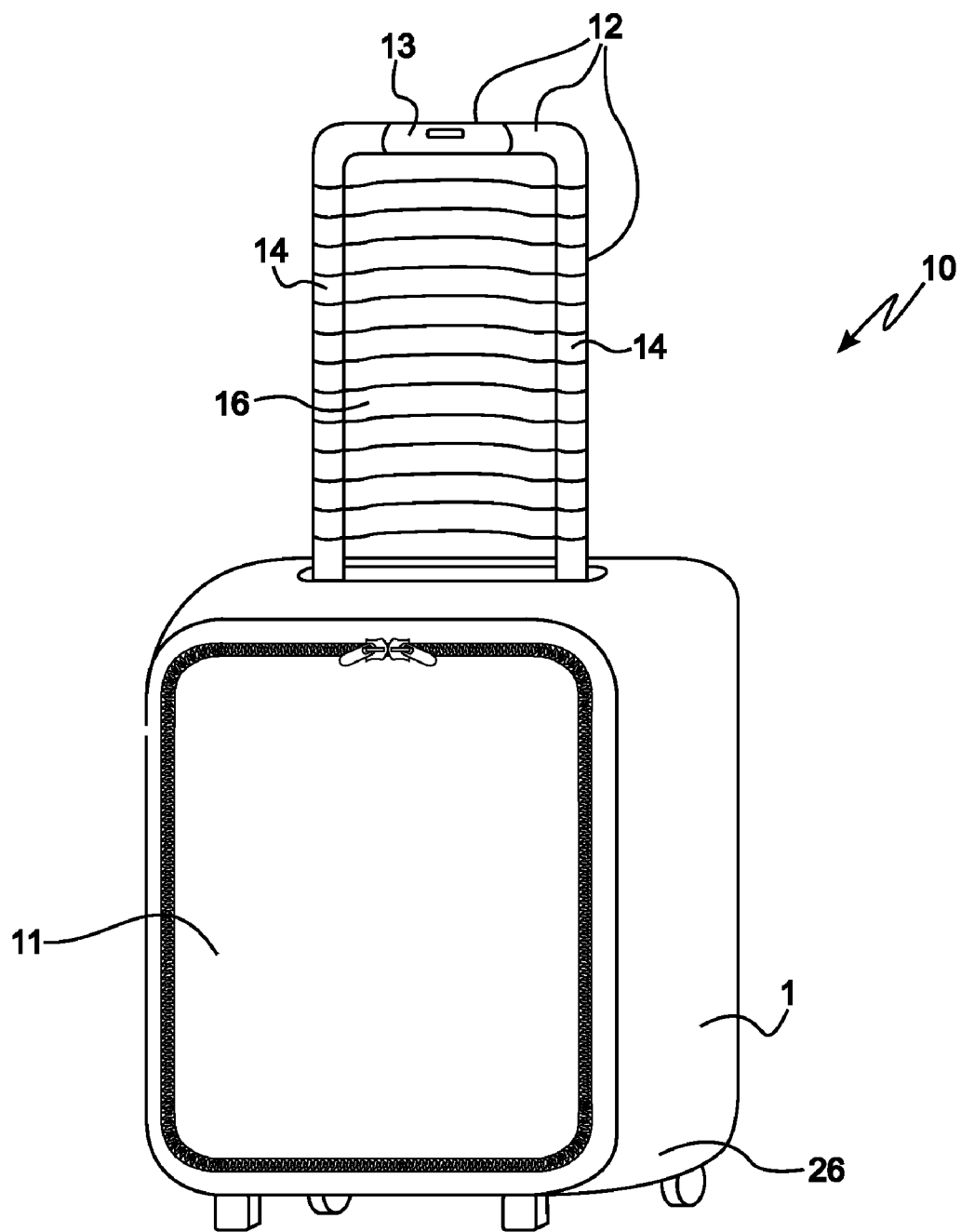
FIG. 1 shows a front perspective view of at least one embodiment of the inventive apparatus.
Figure 2A:
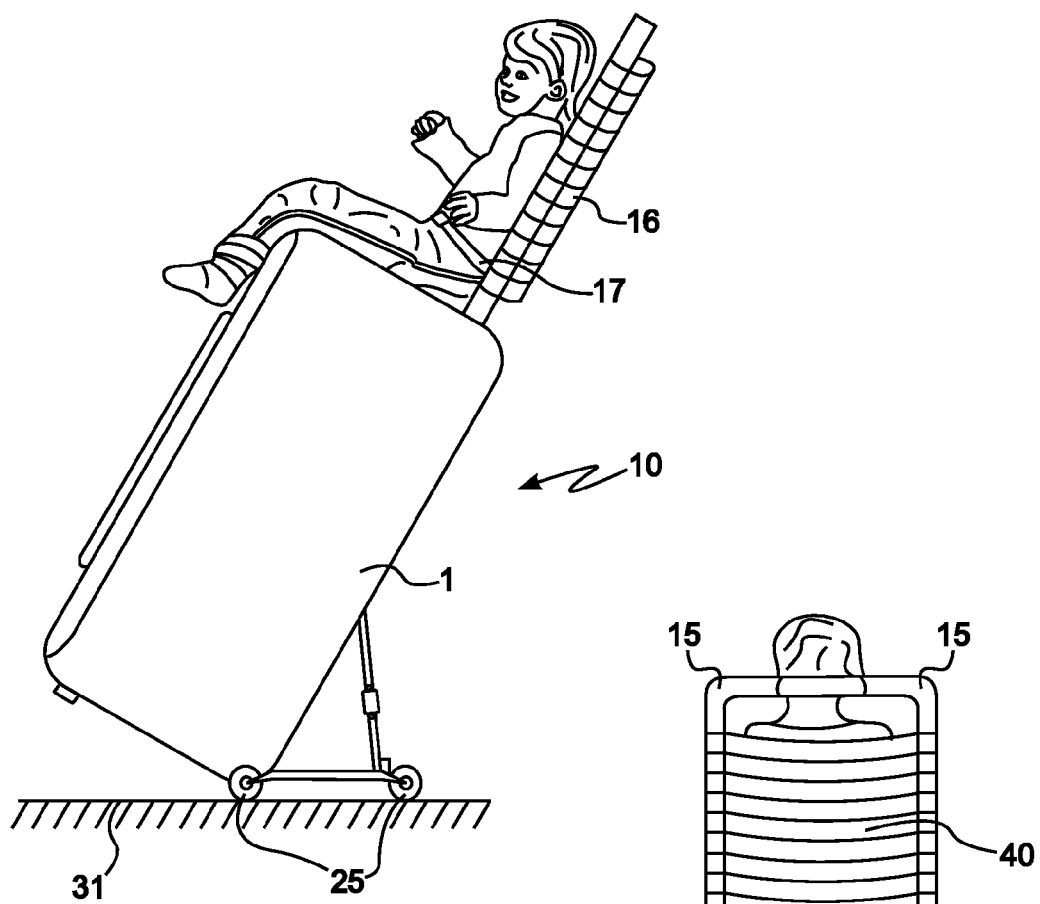
FIG. 2A shows a side view of at least one embodiment of the inventive apparatus.
Figure 2B:
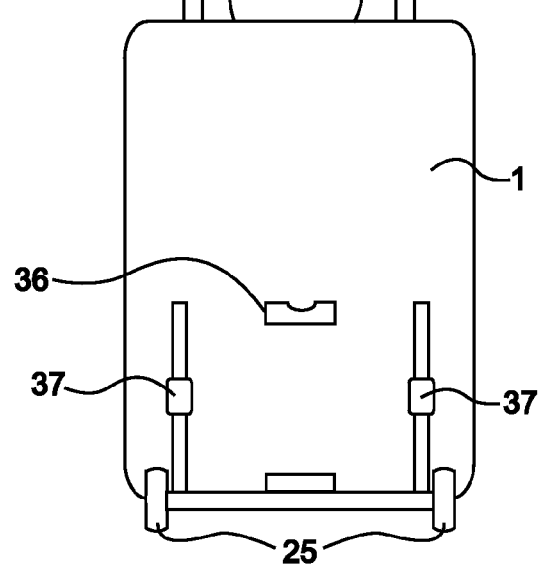
FIG. 2B shows a rear view of at least one embodiment of the inventive apparatus.

At least one embodiment of the inventive apparatus may be a convertible suitcase stroller apparatus 10 that comprises a suitcase 1 that is openable at at least one side 11; a handle assembly 12 that is reconfigurable between a storage configuration (see, e.g., FIGS. 3D, 4B-D and 5C) and a deployed configuration (see, e.g., FIGS. 1, 2A and 2B) and that has a handgrip portion 13 and two handle stems 14, wherein each of said two handle stems has an upper end 15 and wherein said handgrip portion 13 is established substantially between said upper ends; fabric seatback material 16 that is established substantially between said two handle stems when said handle assembly is in said deployed configuration; a child seatbelt 17 that is securable around a child 20 seated directly on said suitcase; and at least two wheels 25 established substantially at a lower portion 26 of the suitcase. Further, in preferred embodiments, a back of said child seated directly on said suitcase is supported against the fabric seatback material, the fabric seatback material is crumpable, and the convertible suitcase stroller apparatus is convertible between: a minimum space occupying configuration (see, e.g., FIG. 3D), a suitcase only toting configuration (see, e.g., FIG. 3C) and a child toting configuration (see, e.g., FIG. 3A). It is of note that even where handle stems might come towards each other at the top, and perhaps even meet, with the handgrip portion established above them, the handgrip portion is said to be between the ends.

The minimum space occupying configuration is, of course, that configuration in which the apparatus occupies a minimum space (i.e., that space that is smaller than the respective spaces occupied by the apparatus when it is in the suitcase only toting configuration and a child toting configuration). In such minimum space occupying configuration, the handle assembly is in its storage configuration and, where there are more than four wheels, at least two of them (e.g., the ones closest to the operator of the apparatus during wheeled toting thereof) are in wheel storage configuration (see, e.g., FIG. 3D). In such wheel storage configuration, at least two of the wheels may be stored against the suitcase, whether partially (or even wholly) within a recess in the suitcase side or not.

The suitcase only toting configuration, as is readily understood, is that configuration into which an operator of the apparatus would establish the apparatus when the operator wants only to tote a suitcase (i.e., and not also a child). It is characterized by an extended handle without a seatback material established between handle stems, and rolling travel on at least two wheels. Where there are four wheels, the operator may either use only two of them (the remaining two would be in wheel storage configuration) or the operator may use all four wheels (after any necessary reconfiguration of wheels from wheel storage configuration to deployed wheel configuration). In this regard, it is of note that where there are four wheels, typically one would only reconfigure wheels as necessary so that all four contact the underlying surface when one was toting a child. The added stability offered by rolling travel on four wheels properly positioned wheels that create a broad base (a square having sides substantially equal to the side depth of the suitcase, as but one of many broad base "shapes") can be an important safety feature for child toting, but one that is not at all necessary for suitcase only toting. In the child toting configuration, preferably (but not necessarily), four wheels contact the surface underlying the apparatus, the handle assembly is in deployed configuration and the seatback material is established between the deployed handle stems. It is also of note that in preferred embodiments, when the apparatus is toted in either suitcase only toting configuration or child toting configuration, the suitcase is tilted off-vertical.

It is of note that the term crumpable, when used to describe the seatback material, indicates that the seatback material is deformable between a child support position 30 (when it's established between the two handle stems and the child's back is resting against it), and a storage configuration (see, e.g., FIGS. 4B, 4C and 4D), where it may occupy a space that has a significantly reduced height as compared to the height of the space occupied by the child support back when it is in child support position. As mentioned, when the seatback material is in storage configuration, it may be established (e.g., crumpled, a term which includes but is not limited to randomly squashed, and folded) into seatback material storage.

In preferred embodiments (but not necessarily all embodiments), the at least two wheels comprise at least four wheels. As mentioned, when four wheels are deployed such that they each contact an underlying surface 31 to form a broad base, added stability results. This can be an important safety feature when toting a child, particularly where the toted child or apparatus may be bumped, as might happen in a crowded airport.

In particular embodiments of the inventive technology, the at least four wheels contact a surface 31 underlying the convertible suitcase stroller apparatus when it is in child toting configuration. As mentioned, when the wheels are properly configured relative to one another, they may provide a stable base for wheeling motion, which may provide particular safety advantages when a child is being toted in heavily trafficked areas (where there is a relatively high chance of collisions with the toted suitcase which would otherwise knock the suitcase—and the child riding thereon—over). Of course, as is readily obvious, the suitcase is tilted off vertical when the apparatus is toted in child toting configuration (or indeed in suitcase only toting configuration). In particular embodiments, at least two 35 of the at least four wheels are reconfigurable between a wheel storage configuration and a deployed wheel configuration. They may be snap reconfigurable, in that they "snap" (or click) into storage configuration (e.g., due to a recess 36 into which a part of the wheel assembly may snap via interference fit) and/or they snap into deployed wheel configuration, perhaps upon manipulation of a foot of a person operating the apparatus. Snap reconfigurable into storage configuration may involve any of many known designs that, perhaps through use of a bias towards either deployed or storage configuration and a locking collar 37 (which also may be biased, preferably towards lock mode), achieve a threshold type securement into either a storage and/or deployed wheel configuration.

In preferred embodiments, but certainly not all, the fabric seatback material comprises cloth 40. It is of note that the term fabric is a broad material, and includes, but is not limited to any of a variety of crumpable, substantially two dimensional materials when lain flat. As such, a properly configured fabric seatback material, such as one that is loosely "suspended" between handle stems (e.g., in a manner not unlike that found in umbrella type strollers) will conform to the back of a child being toted by the apparatus.

The apparatus may also contain additional features; such features includes but are certainly not limited to a divider 41 established in the suitcase so as to define at least two storage sections (e.g., an upper section 42 and a lower section 43 when the suitcase is in its upright configuration). A rollable diaper change mat 45 may be established in the lower section and may be rolled out to provide a working surface for a diaper change. Either section may include one or more diaper pouches 46 and/or baby bottle storage pouches 47. It is of note that even embodiments without a divider may include a rollable diaper mat and/or pouches against any inner surface of the suitcase. One of the other many additional features provides the ability to remove at least two wheels so that they can be replaced with larger, more treaded wheels 50. Such wheels would improve traction on wet, muddy or other slick or uneven surfaces. It is also of note that two or more of the wheels may be "crazy" wheels 51 (wheels that may rotate about a substantially vertical axis before or during rolling).

In certain embodiments, there may be provided child seat back material storage 6, perhaps in the form of a compartment. Of course, the child seat back material storage may be used to store the child seat back material when such material is not being used as a backing for a child seat (see, e.g., FIGS. 4B-D). In at least one embodiment, the child seat back material storage may be a compartment located substantially at the site where the handle stems meet the suitcase body. Locating a compartment in such manner facilitates conversion of the suitcase stroller apparatus from its suitcase configuration to its stroller configuration by: placing the child seat back material storage immediately below where it will be used as a child seat back; and, possibly, also enabling the engagement of the child seat back material with the handle stems such that reconfiguring the handle assembly from handle storage to handle deployment configuration effects reconfiguration of the child seat back material from a child seat back material storage configuration to a seated child support configuration. Such "automatic" reconfiguration, where present, greatly facilitates conversion of the apparatus from its suitcase configuration to its stroller configuration. When the child seat back material is in seated child support configuration, the top of the upright suitcase may serve as the bottom of the seat for the child as the child's back rests against the child seat back material and his/her feet perhaps "dangle" against the trailing side of the suitcase while it is rolled by, e.g., one of the child's parents. A child seatbelt 17 may be included to secure the child in seated position.

Figure 5A:
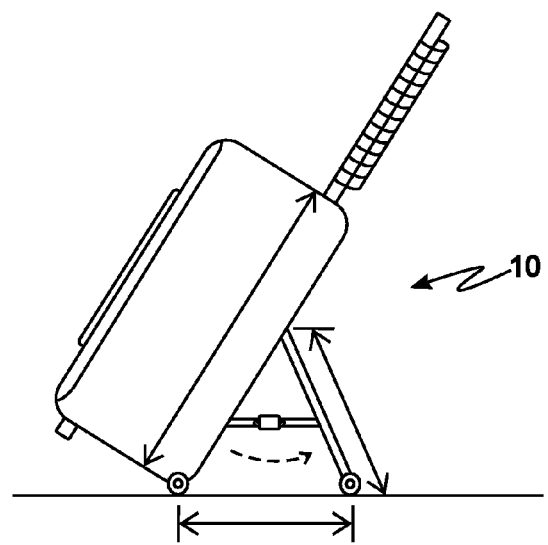
FIG. 5A shows a side view of an embodiment of the inventive apparatus.
Figure 5B:
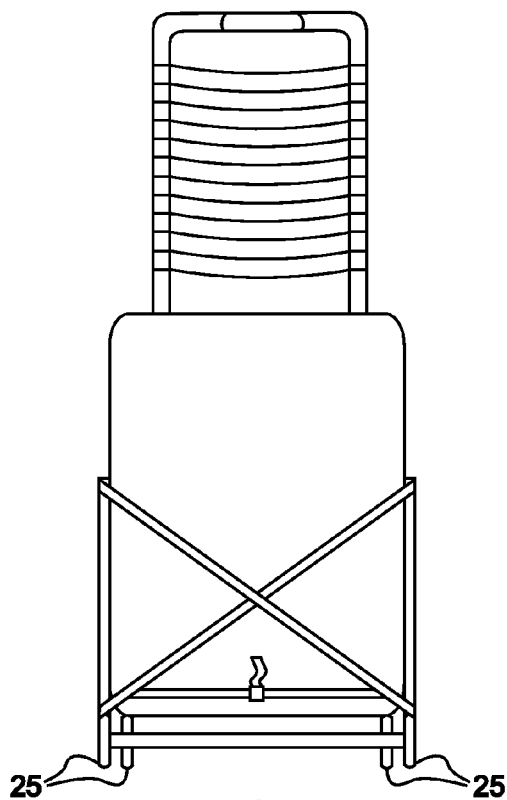
FIG. 5B shows a rear view of an embodiment of the inventive apparatus.
Figure 5C:
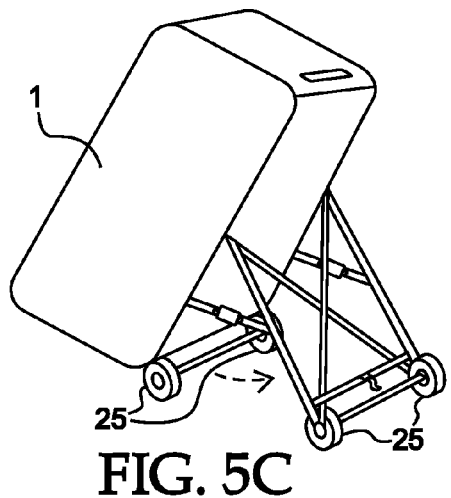
FIG. 5C shows a rear perspective view of an embodiment of the inventive apparatus.
Figure 7A:
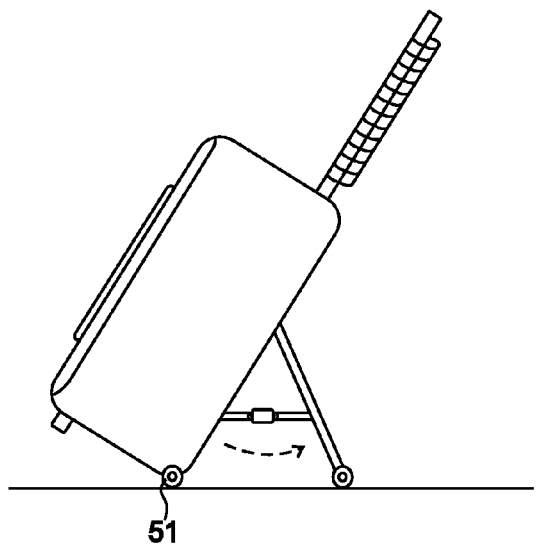
FIG. 7A shows a side view of an embodiment of the inventive apparatus.
Figure 7C:
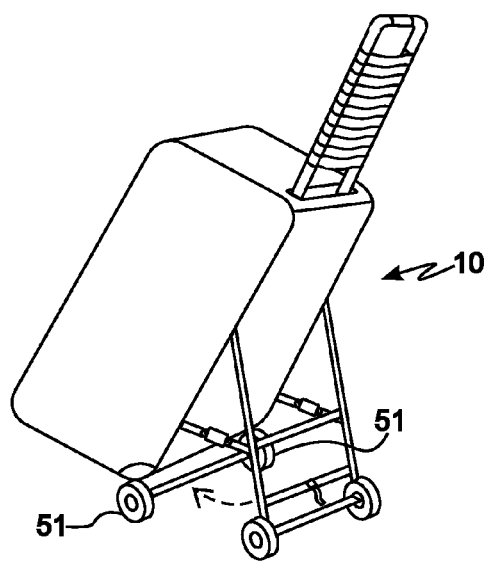
FIG. 7C shows a rear perspective view of an embodiment of the inventive apparatus.
Figure 7B:
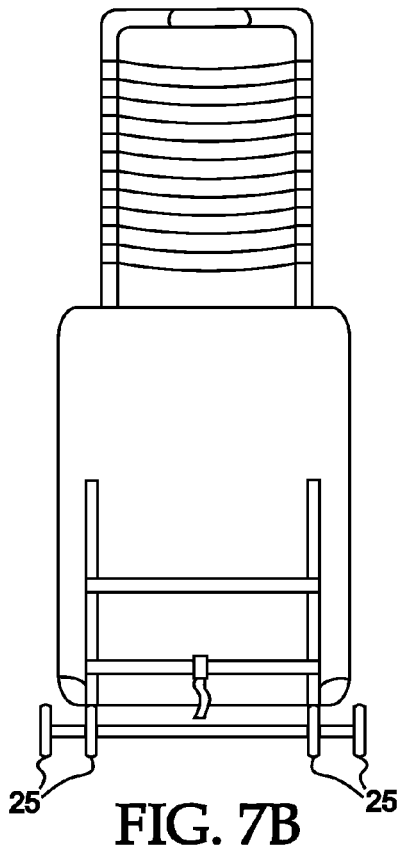
FIG. 7B shows a rear view of an embodiment of the inventive apparatus.
Figure 7D:
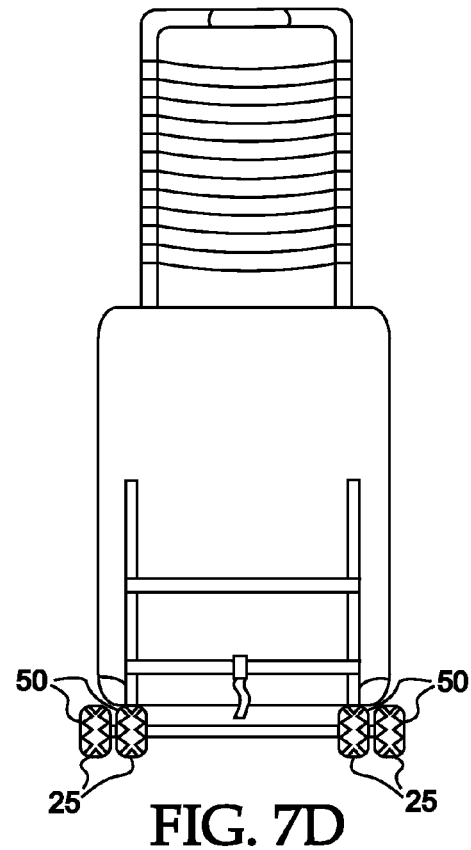
FIG. 7D shows a rear view of an embodiment of the inventive apparatus with sliding wheel deployment capability.
Figure 8A:
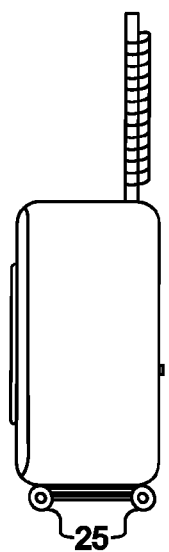
FIG. 8A shows a side view of an embodiment of the inventive apparatus with sliding wheel deployment capability, in particular showing the wheels in fully deployed mode.
Figure 8B:
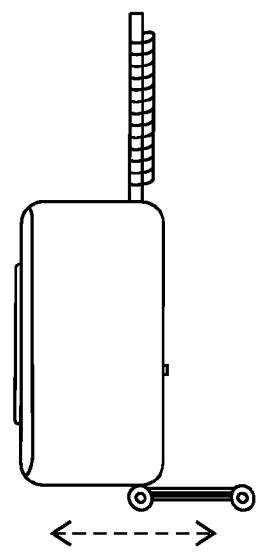
FIG. 8B shows a side view of an embodiment of the inventive apparatus with sliding wheel deployment capability, in particular showing the wheels in an intermediate deployed mode.
Figure 8C:
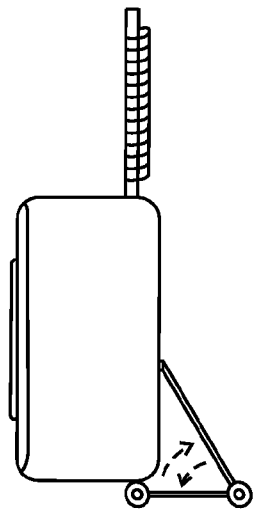
FIG. 8C shows a side view of an embodiment of the inventive apparatus with sliding wheel deployment capability, in particular showing the wheels in deployed mode.
Figure 8D:
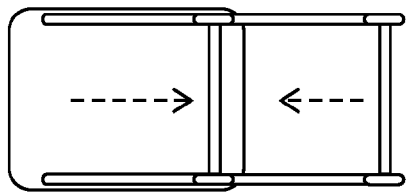
FIG. 8D shows a top view of an embodiment of the inventive apparatus with sliding wheel deployment capability, in particular showing the wheels in deployed mode.
Figure 8E:
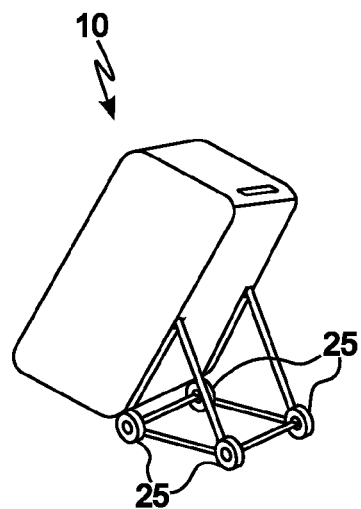
FIG. 8E shows a rear perspective view of an embodiment of the inventive apparatus with sliding wheel deployment capability, in particular showing the wheels in deployed mode.
Figure 9A:
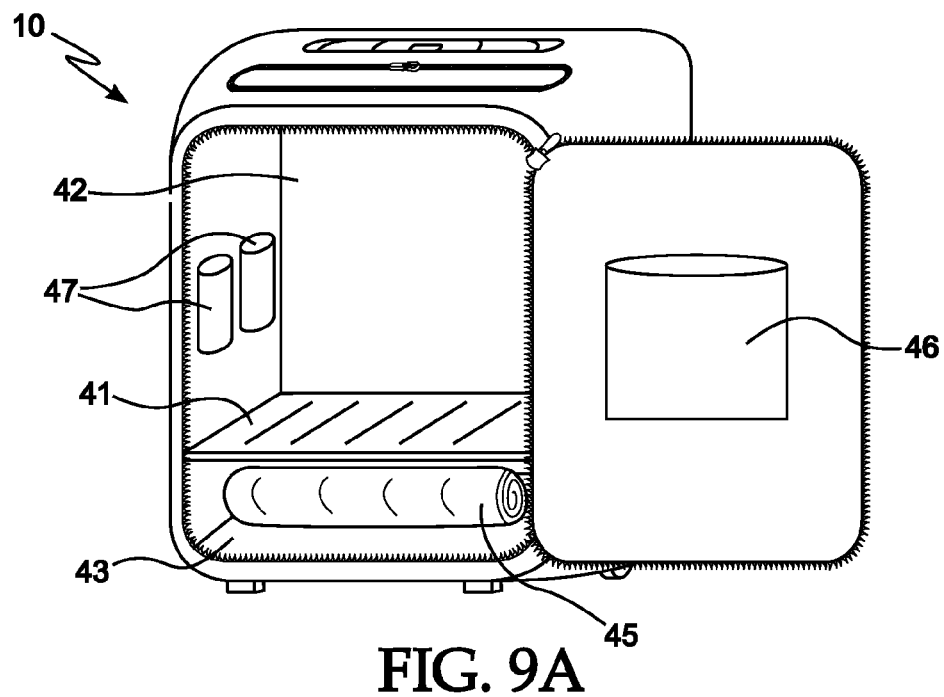
FIG. 9A shows a front perspective view of an embodiment of the apparatus opened to show possible features of the inventive technology.
Figure 9B:
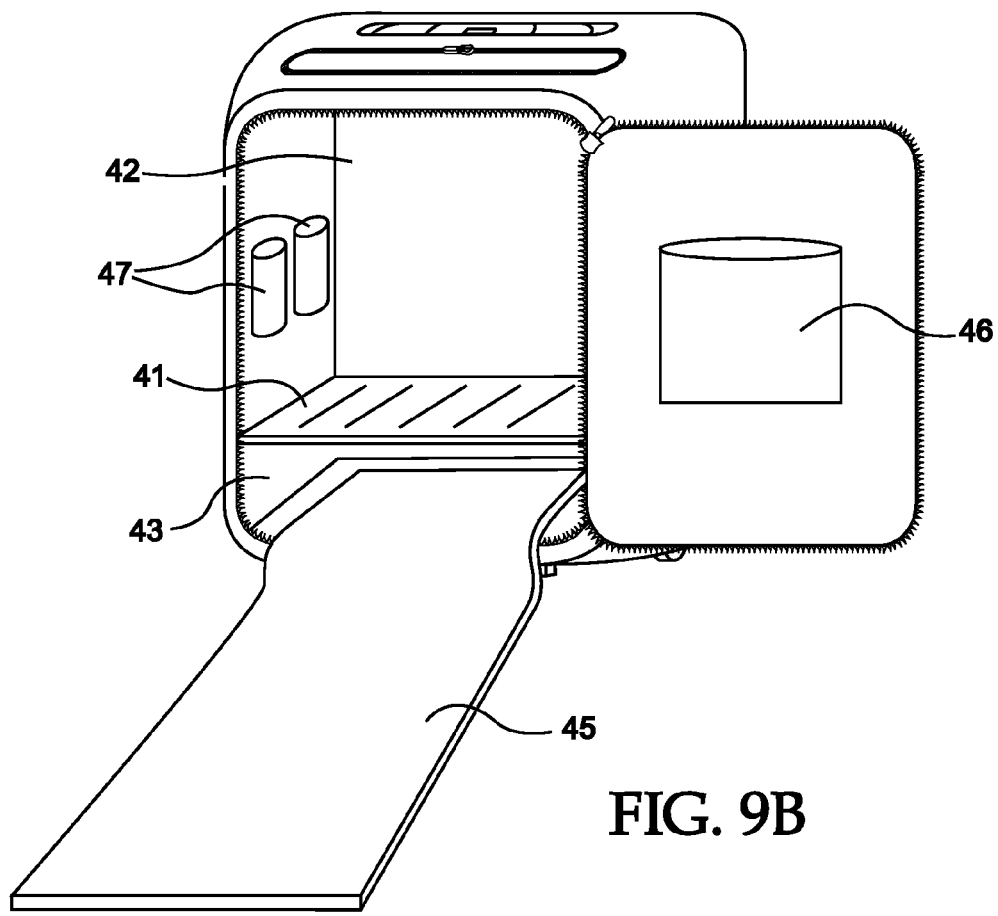
FIG. 9B shows a front perspective view of an embodiment of the apparatus opened to show possible features of the inventive technology, showing in particular the rollable diaper change mat in rolled out configuration.

In either an embodiment offering such "automatic" seatback material reconfiguration or in a design requiring a manual reconfiguration of the child seat back material from a child seat back material storage configuration to a seated child support configuration, the child seat back material may be attached to the handle stems in several ways, including but not limited to: Velcro™, buttons (snap or other), ties or clasps along the length of the handle stems, or perhaps sewn sleeves that can fit over the handle stems but removed therefrom when the handle assemble is removed from the suitcase (when, indeed, such removal is possible). Such are examples of non-destructive detachability. In particular embodiments allowing for manual reconfiguration of the child seat back material, the handgrip portion, and any other handle assemble components disposed at the top of the handle assembly may be removable so that sleeves of the child seat back material can be placed over the handle stems. Of course, in the design requiring a manual reconfiguration of the child seat back material from a child seat back material storage configuration to a seated child support configuration (e.g., FIG. 5), the child seat back material is likely detachable from the handle stems. Further, there may be provided a small hatch 8 that serves to enclose storage. In the "automatic" reconfiguration design, the child seat back material need not be detachable from the handle stems. Additionally, it is of note that in either an embodiment offering such "automatic" reconfiguration, or in a design requiring a manual reconfiguration of the child seat back material from a child seat back material storage configuration to a seated child support configuration, the child seat back material, the child seat back material storage may have (as but one example) a slot opening 7 from which the material may be extracted when, e.g., the handle is pulled up (or from which the material may be extracted by hand when the extraction of the child seat back material is not automatic). The slot, or other opening, may be disposed substantially along an edge of the suitcase and may extend between the handle stem wells 9.

It is of note that when the child seat back material is not detachable from the handle stems, then every time the handle assembly is reconfigured from handle storage to handle deployment configuration, the child seat back material will also be deployed from its storage to its seated child support configuration. Of course, if a child is not present, or if the child prefers to walk instead, this might not be desired. For this reason, the child seat back material of certain embodiments is detachable from the handle stems. It is of note that in particular embodiments, there may be provided a trigger that releases and/or engages the seatback material so that the seatback material may be deployed with the handle assembly (automatic reconfiguration) or not, as desired.

It is of note that the handle stems of a conventional wheeled suitcase might not be close enough to one another in order to properly serve as side attachment sites for child seat back material. As such, in addition to other modifications, the handgrip portion, the handle grip portion pod from which the handgrip portion extends, and the handle stem wells into which the handle stems may be retracted should be designed such that the handle stems, when the handle assembly is in handle deployment configuration, are far enough apart. Of course, they are sufficiently far apart when they do not uncomfortably "hit" against the back of a seated child, or otherwise compromise the operation of the suitcase stroller apparatus.

The handle assembly can be reconfigurable from handle storage to handle deployment configuration in any of the manners well known to those skilled in the art of wheeled luggage with extendable handles. In addition, it should be noted that the term "suitcase" as used herein, is intended to include any type of luggage, regardless of whether a piece of luggage is made primarily from rigid (e.g., hard plastic), soft, or other material. The inventive apparatus may be made using any of many techniques that would be well known to one of ordinary skill in the relevant art.

As can be easily understood from the foregoing, the basic concepts of the present invention may be embodied in a variety of ways. It involves both child toting techniques as well as devices to accomplish the appropriate toting. In this application, the child toting techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "storage" should be understood to encompass disclosure of the act of "storing"—whether explicitly discussed or not—and, conversely, were there effectively disclosure of the act of "storing", such a disclosure should be understood to encompass disclosure of a "storage" and even a "means for storing" Such changes and alternative terms are to be understood to be explicitly included in the description.

Any acts of law, statutes, regulations, or rules mentioned in this application for patent; or patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the child stroller devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A convertible suitcase stroller apparatus comprising:
   a suitcase that is openable at at least one side and that comprises handle stem wells, each having a handle stem well opening;
   a handle assembly that is reconfigurable between a handle storage configuration and a deployed handle configuration and that has a handgrip portion and two handle stems, wherein each of said two handle stems has an upper end and wherein said handgrip portion is established substantially between said upper ends;
   crumpable fabric seatback material that is established substantially between said two handle stems when said handle assembly is in said deployed configuration;
   at least two wheels established substantially at a lower portion of said suitcase,
   wherein said convertible suitcase stroller apparatus is convertible between:
      a minimum space occupying configuration,
      a suitcase only toting configuration, and
      a child toting configuration,
   wherein said minimum space occupying configuration, said suitcase only toting configuration, and said child toting configuration are distinct configurations,
   wherein said suitcase has a storage capacity that is equal when said convertible suitcase stroller apparatus is in said minimum space occupying configuration, said suitcase only toting configuration, and said child toting configuration,
   wherein said fabric seatback material is non-destructively detachable from said two handle stems when said handle assembly is in said deployed handle configuration,
   wherein, when said apparatus is in said suitcase only toting configuration, said suitcase is in an upright position and has an uppermost portion,
   wherein said uppermost portion is a suitcase top,
   wherein, when said convertible suitcase stroller apparatus is in said child toting configuration, that portion of said suitcase that is uppermost is said suitcase top, and
   wherein a back of a child seated directly on said suitcase top is supported against said fabric seatback material,
   said apparatus further comprising:
   a slot opening that extends between said handle stem well openings; and
   a seatback material storage compartment established at said suitcase top and below said slot opening so as to store said crumpable fabric seatback material when crumpled.

2. A convertible suitcase stroller apparatus as described in claim 1 wherein said suitcase is tilted off vertical when said apparatus is in said child toting configuration.

3. A convertible suitcase stroller apparatus as described in claim 1 wherein said at least two wheels comprise at least four wheels.

4. A convertible suitcase stroller apparatus as described in claim 3 wherein said at least four wheels contact a surface underlying said convertible suitcase stroller apparatus when said apparatus is in said child toting configuration.

5. A convertible suitcase stroller apparatus as described in claim 4 wherein said suitcase is tilted off vertical when said apparatus is in said child toting configuration.

6. A convertible suitcase stroller apparatus as described in claim 1 wherein at least two of said at least two wheels are reconfigurable between a wheel storage configuration and a deployed wheel configuration.

7. A convertible suitcase stroller apparatus as described in claim 6 wherein said at least two of said at least four wheels that are reconfigurable between a storage configuration and a deployed configuration are reconfigurable between said wheel storage configuration and said deployed wheel configuration through manipulation of a foot of a person operating said convertible suitcase stroller apparatus.

8. A convertible suitcase stroller apparatus as described in claim 6 wherein said at least two of said at least four wheels are snap reconfigurable between a wheel storage configuration and a deployed wheel configuration.

9. A convertible suitcase stroller apparatus as described in claim 1 wherein said fabric seatback material comprises cloth.

10. A convertible suitcase stroller apparatus as described in claim 1 wherein said fabric seatback material is configured to conform to said back of said child.

11. A convertible suitcase stroller apparatus as described in claim 1 further comprising a divider established in said suitcase so as to define at least two storage sections.

12. A convertible suitcase stroller apparatus as described in claim 11 wherein one of said at least two storage sections is a lower section.

13. A convertible suitcase stroller apparatus as described in claim 12 further comprising a rollable diaper change mat established in said lower container section.

14. A convertible suitcase stroller apparatus as described in claim 12 wherein one of said at least two storage sections is an upper section.

15. A convertible suitcase stroller apparatus as described in claim 14 further comprising at least one baby bottle storage pouch established in said upper section.

16. A convertible suitcase stroller apparatus as described in claim 14 further comprising at least one diaper pouch established in said upper section.

17. A convertible suitcase stroller apparatus as described in claim 1 wherein at least two of said at least two wheels are removable and replaceable with larger, more treaded wheels.

18. A convertible suitcase stroller apparatus as described in claim 1 further comprising a rollable diaper change mat established in said suitcase.

19. A convertible suitcase stroller apparatus as described in claim 1 wherein reconfiguration of said handle assembly from said deployed handle configuration to said handle storage configuration automatically, without detachment of said crumpable fabric seatback material, effects: (a) crumpling of said crumpable fabric seatback material and (b) insertion of said crumpable fabric seatback material through a slot opening and into said seatback material storage compartment.

20. A convertible suitcase stroller apparatus as described in claim 19 wherein reconfiguration of said handle assembly from said handle storage configuration to said deployed handle configuration automatically effects: (a) uncrumpling of said crumpable fabric seatback material; and (b) extraction of said crumpable fabric seatback material from said seatback material storage compartment through said slot opening.

* * * * *